United States Patent [19]

Schofield et al.

[11] Patent Number: 5,025,267
[45] Date of Patent: Jun. 18, 1991

[54] THERMAL PRINT HEAD TERMPERATURE CONTROL

[75] Inventors: Harold D. Schofield, Naragansett; Paul R. Caron, Tiverton, both of R.I.

[73] Assignee: DataCard Corporation, Minnetonka, Minn.

[21] Appl. No.: 248,829

[22] Filed: Sep. 23, 1988

[51] Int. Cl.$^5$ .................... G01D 9/00; G01D 15/10
[52] U.S. Cl. .................... 346/1.1; 346/76 PH; 400/120
[58] Field of Search ............ 346/76 PH, 1.1; 400/120 PH

[56] References Cited

U.S. PATENT DOCUMENTS

| 4,415,908 | 11/1983 | Sugiura | 346/76 PH |
|---|---|---|---|
| 4,464,669 | 8/1984 | Sekiva et al. | 346/76 PH |
| 4,563,691 | 1/1986 | Noguchi et al. | 346/76 PH |
| 4,573,058 | 2/1986 | Brooks | 346/76 PH |
| 4,587,530 | 5/1986 | Noguchi | 346/76 PH |
| 4,590,484 | 5/1986 | Matsushita | 346/76 PH |
| 4,590,487 | 5/1986 | Noguchi et al. | 346/76 PH |
| 4,590,488 | 5/1986 | Sullivan | 346/76 PH |
| 4,591,876 | 5/1986 | Nozaki et al. | 346/76 PH |
| 4,633,269 | 12/1986 | Mikami et al. | 346/76 PH |
| 4,636,810 | 1/1987 | Asakura et al. | 346/76 PH |
| 4,650,350 | 3/1987 | Dorner | 346/76 PH |
| 4,663,734 | 5/1987 | Berry | 346/76 PH |
| 4,723,132 | 2/1988 | Matsuo | 346/76 PH |

FOREIGN PATENT DOCUMENTS

| 0171367 | 8/1986 | Japan | 346/76 PH |
|---|---|---|---|
| 0241170 | 10/1986 | Japan | 346/76 PH |
| 0249776 | 11/1986 | Japan | 400/120 |

Primary Examiner—Bruce A. Reynolds
Assistant Examiner—Huan Tran
Attorney, Agent, or Firm—Merchant, Gould, Smith, Edell, Welter & Schmidt

[57] ABSTRACT

An apparatus and method is disclosed for controlling the temperature of a thermal print head and individual dot elements thereon, thereby optimizing print quality and reducing the thermal and electrical stress on the thermal print head. Hysteresis control determines the amount of energy supplied to each dot element in the thermal print head. Peak temperature control determines the width of the pulses supplied to the dot elements on the thermal print head. Pre-heating control raises the temperature of each dot element when the dot element has been idle for a predetermined period. Substrate temperature control maintains the temperature of said thermal print head at a predetermined value.

12 Claims, 3 Drawing Sheets

THERMAL PRINT HEAD TERMPERATURE CONTROL

FIELD OF THE INVENTION

The present invention pertains generally to a method and apparatus for controlling the temperature of a thermal print head and individual dot elements thereon.

BACKGROUND OF THE INVENTION

In high-speed thermal printing, the individual print head element temperature must be accurately controlled to assure print quality. This temperature is determined by the energy electrically deposited into the heating element for each cycle, the cycle time, the printhead substrate temperature, and the ambient temperature.

Individual dot temperature is a time-axis phenomena wherein dot elements which undergo repetitive printing at print rates that exceed the thermal response of the print system experience self-heating effects. Dot elements that are seldom reprinted remain at the ambient temperature of the print head array.

Print head substrate temperature is a function of both printing and ambient temperature. Relative to printing, areas on the print head where groups of contiguous dot elements are continually reprinted (e.g., block graphics) can cause an elevation of the print head substrate temperature. Elevating the substrate temperature reduces its heat sinking capability which affects the time-axis response of individual dot temperature and can also endanger IC driver chips.

Significant ambient temperature variations can also cause these problems since, over time, the substrate temperature will vary as a function of the ambient temperature. Variations in the substrate temperature of the print head can affect the thermal response characteristics of the printhead as well as the differential energy required to produce thermal transfer.

SUMMARY OF THE INVENTION

One object of the present invention is to provide a temperature control apparatus and method to both optimize print density and minimize stress on a thermal print head, thereby increasing the print head's lifespan. This is accomplished by combining thermal hysteresis control, peak dot temperature control, individual dot pre-heating, and print head substrate temperature control.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized without departing from the scope of the present invention.

Figure 1:
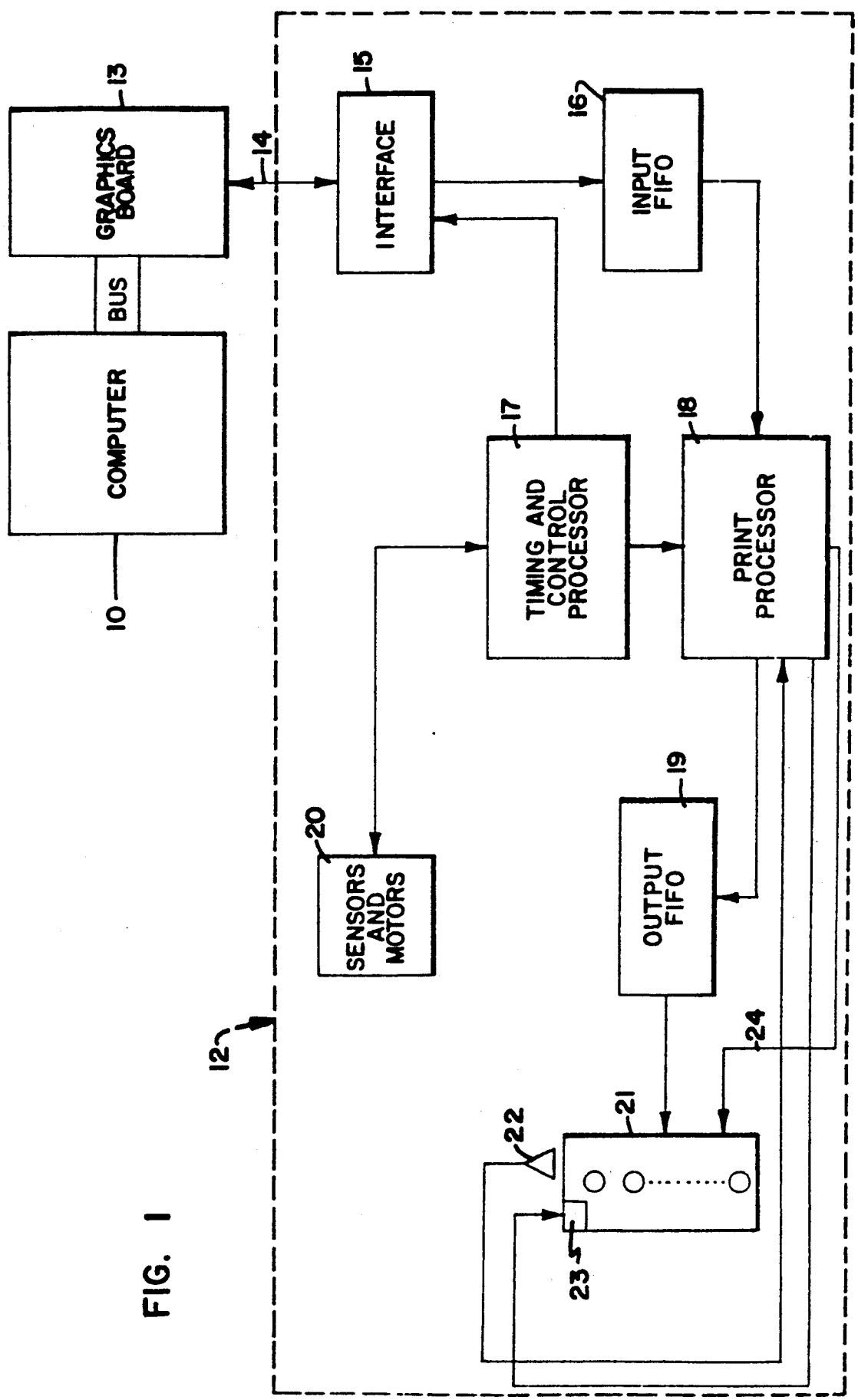
FIG. 1 is a block diagram of the hardware components of the present invention.

Referring initially to FIG. 1, the Print Engine 12 of the preferred embodiment applies card image data to the plastic cards through the use of fixed array thermal transfer technology. The Print Engine 12 is equipped with a custom thermal Print Head 21 providing a single "column" of dot elements vertically oriented with respect to the printing surface. The "dots" are resistive elements that, when turned "on", heat up a foil and transfer ink from a carrier (ribbon). The dot elements remain "off" at areas left blank. Each dot element is controlled by a binary digit supplied to the Print Head 21, wherein a binary "1" means the corresponding dot element is turned "on" and a binary "0" means the corresponding dot element is turned "off".

The thermal Print Head 21 is the most vulnerable component in the Print Engine 12, so steps which increase the lifespan of the Print Head 21 increase the cost effectiveness of the Print Engine 12. The goals of the present invention, therefore, are to (1) optimize print quality and consistency while (2) minimizing the electrical and thermal stress on the Print Head 21.

Figure 2:
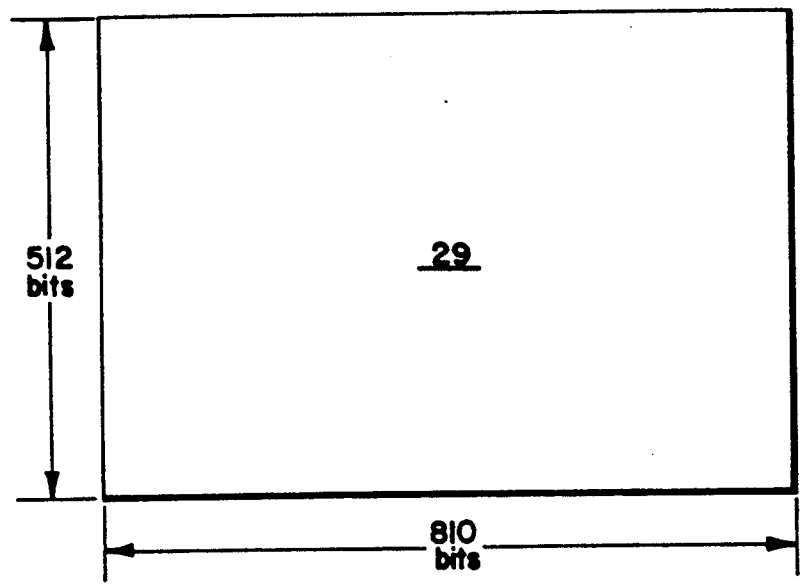
FIG. 2 is a block diagram describing a card image buffer printed on the thermal printer.

The progress of the card through the system is monitored by the Timing And Control Processor 17 via Sensor And Stepper Motor signals 20. The Print Head 21 is brought into contact with the plastic card at the column dictated by a "starting column" value sent by the Host Computer 10. The card image is printed until the "ending column" value is reached, which value is also transmitted from the Host Computer 10. These "starting column" and "ending column" quantities have default values of column 1 and 810, respectively. FIG. 2 depicts a card image 29. A column consist of 512 bits numbered 0 through 511, wherein bit 0 represents the lower left corner of the image and bit 511 represents the upper left corner of the image. A row consists of 810 columns numbered 0 through 809, wherein column 0 begins on the left side of the card image buffer 29.

A Graphics Board 13 converses directly with the Host Computer 10, when the Host Computer 10 wishes to print a card image. The Graphics Board 13 stores the card image in a RAM buffer, and converses with the Print Engine 12 via cable 14 and Interface 15. The Interface 15 delivers data and commands from the Host Computer 10 to the Print Engine 12. The Interface 15 is concerned with 5 elements: the Transfer Request message; the Transfer Acknowledge message; Input FIFO 16 buffer selection; a Write Strobe; and an 8 bit parallel data interface. The Transfer Request message is sent by the Print Engine 12 to the Graphics Board 13 to request the current column of data and the previous 3 columns of data. The Graphics Board 13 responds with the data and a Transfer Acknowledge message. The Interface 15 is responsible for loading the Input FIFO 16 properly. This requires that the first 256 bits of each column of data be written to the first buffer in the Input FIFO 16. Next, the Interface 15 de-selects the first buffer, selects the second buffer, and transmits the remaining 256 bits of each column of data into the Input FIFO 16. This is repeated for each column of data. The Write Strobe signal strobes the 8 bit parallel data into the chosen Input FIFO 16 buffer.

The Print Head 21 is driven by two separate buffers in an Output FIFO 19. Each buffer is loaded separately and serially by the Print Processor 18 which reads the data from the Input FIFO 16. In terms of card progress through the system, the Print Engine 12 waits until the card has reached Print Head 21 and then requests 3 consecutive columns from the Graphics Board 13. This action buffers data in the Input FIFO 16 and the Output FIFO 19. The Timing And Control Processor 17 is responsible for synchronizing the Print Processor 18 with the card's position, based upon the Sensor And Stepper Motor signals 20. The Sensor And Stepper Motor signals 20 first indicate that the card is positioned at the Print Head 21. The Timing And Control Processor 18 monitors subsequent signals 20 indicating each column advance of the card, and activates the Print Processor 18 accordingly. Once card printing begins, subsequent data is requested on a column by column basis from the Graphics Board 13. The Interface 15 is responsible for keeping pace with the printing process.

As mentioned herein earlier, during the printing of a card image each column requires that the 3 previous columns of data, as well as the current column of data, be sent to the Print Engine 12. The Print Processor 18 uses this historical data to provide thermal hysteresis control for each dot element in the Print Head 21. The past history of each dot element for the previous four print cycles is used to calculate the exact energy necessary to raise the dot element temperature to the ideal printing temperature. The energy supplied to the Print Head 21 is controlled by dividing the Print Head Strobe 24 into five mini-phases. These five "mini-phases" are: 1) the transparent phase; 2) three compensation phases; and 3) the pre-heat phase. The Boolean algebra that describes the logic for determining when a mini-phase is "on" is in the lower portion of FIG. 4, generally identified by reference numeral 40.

The transparent phase is the first data loaded into the Print Head 21 by the Print Processor 18 and the widest Print Head Strobe 24 by the Print Processor 18. This data, loaded into the Output FIFO 19, is the current column of data read from the Input FIFO 16.

The compensation phases are of equal time duration and yield active dot elements within the Print Head 21 depending upon the past history of each dot element. Whether a dot element is turned "on" during a compensation phase depends on whether the transparent phase is turned "on" for the current column and whether the dot element was "off" during the previous columns printed. The dot element is turned "on" for the first compensation phase if it was "off" during the first prior column (i.e., one column earlier). The dot element is turned "on" for the second compensation phase if it was "off" during the first and second prior columns (i.e., one and two columns earlier). The dot element is turned "on" for the third compensation phase if it was "off" during the first, second and third prior columns (i.e., one, two, and three columns earlier).

The pre-heat phase is used to reduce the differential temperature stress on a dot element. The pre-heat phase occurs if a dot element is "off" for the entire hysteresis period (i.e., if the dot element is "off" in the current column and it was "off" for all three prior columns). A pre-heat phase is required because the transfer temperature of the foils utilized in the preferred embodiment is higher than the typical thermal media. This higher transfer temperature, coupled with the need to eliminate density variations as a function of ambient temperature, dictates the need for methods of pre-heating dot elements in the Print Head 21 to further reduce differential temperature stress. Pre-heating dot elements in the Print Head 21 also reduces the need to vary the applied energy within the print pulse as a function of the ambient temperature, as discussed herein later.

Figure 4:
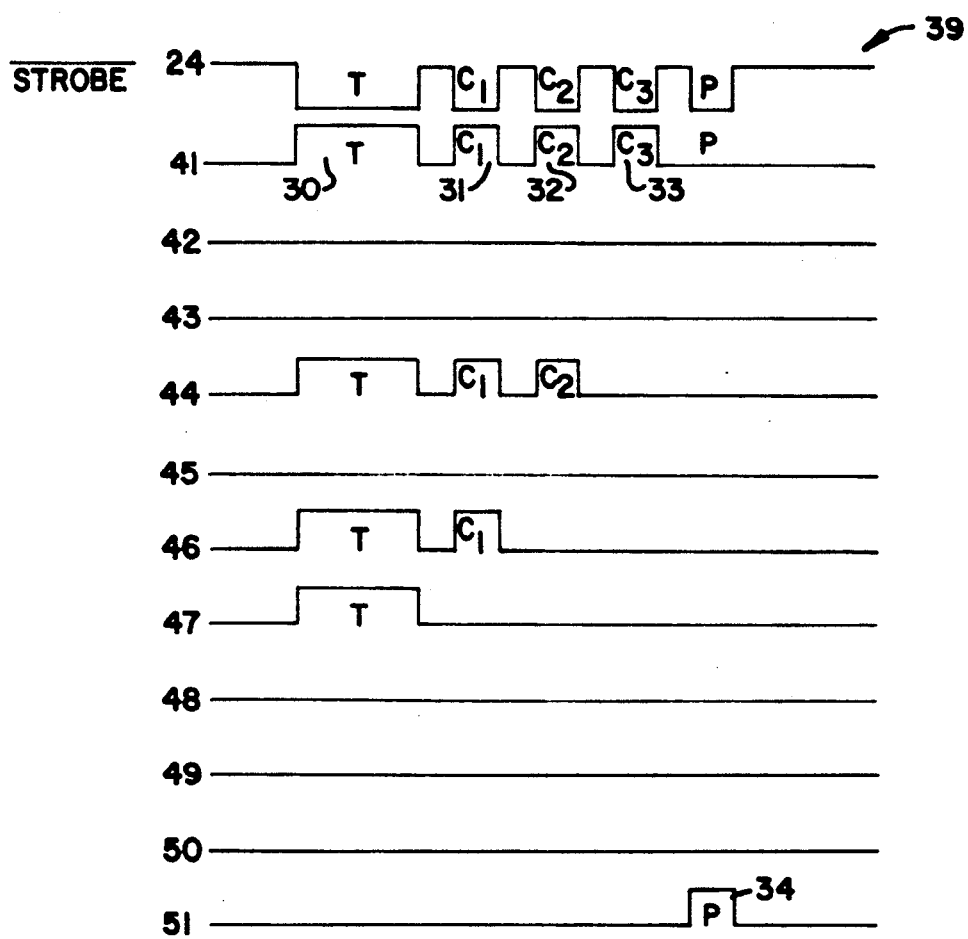
FIG. 4 is an example dot combination and the resulting timing diagrams of the mini-phases according to the present invention.

FIG. 4 provides an example of the logic used by Print Processor 18 to determine how many mini-phases should be generated. At the top of FIG. 4 is an example "past history" for a dot element, generally identified by reference numeral 38. Beginning on the left side of the diagram, the printer begins from a cold start. For the next 11 print cycles after cold start, the example dot element is "on" for one cycle, "off" for two cycles, "on" for one cycle, "off" for one cycle, "on" for two cycles, and "off" for four cycles.

Underneath each cycle indicator of "on" or "off" is a reference numeral, 41 through 51. These reference numerals correspond to the timing diagrams in FIG. 4, generally identified by reference numeral 39. The first timing diagram illustrates the Print Head Strobe 24, which is an inverted signal. The following timing diagrams illustrate the mini-phases for each print cycle.

In timing diagram 41, the first print cycle after cold start, the current column is "on" resulting in an active transparent phase 30. Because there are no prior columns of data to be used in determining how many mini-phases should be generated, three "initialization" columns are transferred by the Graphics Board 13 wherein each column consists of all "off" dot elements. Therefore, the transparent phase 30 is concatenated with compensation phases 31, 32 and 33.

In timing diagram 42, the second print cycle after cold start, the current column is "off" resulting in an "off" transparent phase 30. Compensation phases 31, 32, and 33, are "off", because the transparent phase 30 is "off". The pre-heat phase 34 is "off" because the first prior column was "on".

In timing diagram 43, the third print cycle after cold start, the current column is "off" resulting in an "off" transparent phase 30. Compensation phases 31, 32 and 33 are "off", because the transparent phase 30 is "off". The pre-heat phase 34 is "off" because the second prior column was "on".

In timing diagram 44, the fourth print cycle after cold start, the current column is "on" resulting in an active transparent phase 30. Compensation phases 31 and 32 are "on" because the first and second prior columns were "off". The pre-heat phase 34 is "off" because the current column is "on" and the third prior column was "on".

In timing diagram 45, the fifth print cycle after cold start, the current column is "off" resulting in an "off" transparent phase 30. Compensation phases 31, 32, and 33 are "off" because the transparent phase 30 is "off". The pre-heat phase 34 is "off" because the first prior column was "on".

In timing diagram 46, the sixth print cycle after cold start, the current column is "on" resulting in an active transparent phase 30. Compensation phase 31 is "on" because the current column is "on" and the first prior column was "off". The pre-heat phase 34 is "off" because the current column is "on" and the second prior column was "on".

In timing diagram 47, the seventh print cycle after cold start, the current column is "on" resulting in an active transparent phase 30. Compensation phases 31, 32, and 33 are "off" because the first and third prior columns were "on". The pre-heat phase 34 is "off"

because the current column is "on" and the first and third prior columns were "on".

In timing diagrams 48, 49, 50, and 51, the eighth through eleventh print cycles after cold start, all current columns are "off" resulting in an "off" transparent phase 30. Compensation phases 31, 32, and 33 are "off" because the transparent phase 30 is "off". In timing diagram 51, the pre-heat phase 34 is "on" because the current column is "off" and all three prior columns were "off".

The Print Processor 18 is responsible for controlling the width of each Print Head Strobe 24. Whenever one to three additional mini-phases are concatenated to the first mini-phase, based on the past print history as described above, this concatenation results in very high electrical duty cycles. The print rate cannot be reduced to maintain a constant duty cycle in the face of dynamically changing individual pulse widths. The worst case can occur with a "cold dot" (i.e., a dot which has been "off" for the four print cycles of the hysteresis algorithm) where the transparent phase plus all three compensation phases are concatenated together to produce the print pulse. The danger is that the "cold dot" can generate a peak dot temperature because of the dramatic increase in the duty cycle, which results from the mini-phase concatenation within a fixed overall print rate. The problem is exacerbated in the preferred embodiment because the high temperature transfer characteristics of the foil require higher energy than standard thermal media.

To overcome this problem, the present invention allows the duty cycle, or pulse width, of individual mini-phases to be established and varied by the Print Processor 18. The pulse width is initially determined by the thermal transfer characteristic of the foil being used. In an alternative embodiment, a foil type signal characterizing the thermal transfer temperature of the foil being used is input to the Print Processor 18. During printing, the temperature of the Print Head 21 is continuously monitored by the Print Processor 18 using Thermistor 22. Thermistor 22 produces a voltage which varies with the temperature. The Print Processor 18 uses the voltage in a compensation algorithm, indexing into a look-up table to retrieve values indicating the desired width of the Print Head Strobe 24. The look-up table is created on the basis of empirical evidence. In an alternative embodiment, the foil type signal is used in conjunction with the Thermistor 22 voltage to index into an extended look-up table. Different foils would have different thermal transfer characteristics requiring different energy levels. For example, different ink color will typically result in a foil having a different thermal transfer temperature. As a result, the Print Head Strobes 24 associated with the mini-phases discussed above are adjusted by the Print Processor 18. Thus, the required foil transfer temperature can be reached while avoiding dangerously high peak temperatures by effectively integrating or time-multiplexing the power applied to the Print Head 21.

The Print Processor 18 computes all five mini-phases for the next column during the printing of the present column. The significance of this approach is that it decouples the minimum width of a mini-phase from the execution time required to generate a mini-phase. This is especially important given that the cycle time for a mini-phase is shortened at high temperatures, to the point where the cycle time can be less than the execution time for computing the mini-phase.

Figure 3:
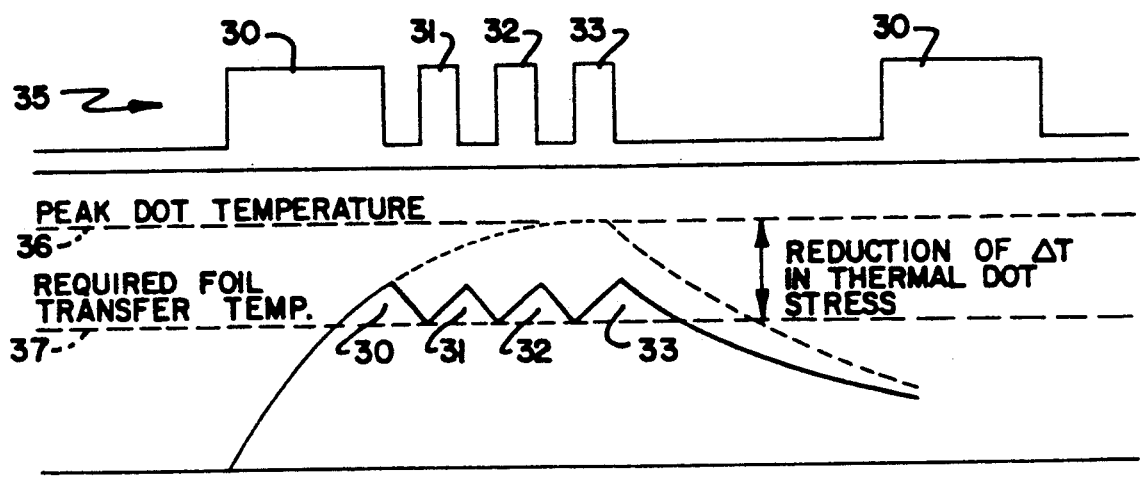
FIG. 3 is a diagram of illustrating the dot temperature effects of the mini-phases across time.

The temperature response of each dot element due to the mini-phases is illustrated in FIG. 3 by the four pulses, generally referred to by reference numeral 35. Pulse 30, associated with the transparent phase, raises the dot element temperature above the required foil transfer temperature 37. However, pulse 30 does not provide enough energy to raise the dot element temperature above the peak dot temperature 36. When pulse 30 ends, the temperature of the dot element begins to drop. After a pre-determined amount of time, pulses 31, 32, and 33, associated with the three compensation phases, are generated to keep the dot element temperature from falling below the required foil transfer temperature 37 or from rising above the peak dot temperature 36. In this way, the present invention maintains the temperature of the dot element above the required foil transfer temperature 37, but below the peak dot temperature 36, thereby optimizing print quality but minimizing thermal stress. Although not shown in FIG. 3, the width of the pre-heat pulse 34 can also vary as a function of the Print Head 21 substrate temperature. Thus, during printing, the Print Processor 18 is able to uniquely establish the appropriate print pulse for each individual dot.

The final factor used in controlling print quality and thermal stress is pre-heating the Print Head 21. The resistance of the Print Head 21 to variations in the ambient temperature can be accomplished through the use of self-regulating Thermistor Heaters 23 mounted to the Print Head 21 heatsink and spaced so as to provide even heat distribution. The Print Processor 18 receives signals from Thermistor 22 indicating the substrate temperature of the Print Head 21, and in turn generates signals to the Thermistor Heaters 23 in an attempt to maintain the Print Head 21 at a constant optimal temperature. Physical pre-heating soaks the Print Head 21 heatsink at a constant background temperature, which allows the present invention to operate in a more stable overall environment.

Although a specific configuration has been illustrated and described for the preferred embodiment of the present invention set forth herein, it will be appreciated by those of ordinary skill in the art that any arrangement which is calculated to achieve the same purpose may be substituted for the preferred embodiment shown. This application is intended to cover any adaptations or variations of the present invention. Therefore it is manifestly intended that this invention be limited only by the claims and the equivalents thereof.

What is claimed is:

1. Apparatus for thermal printing of graphics images, comprising:

a thermal printhead comprised of a plurality of dot elements;

means for controlling the temperature of said dot elements and said thermal printhead, thereby optimizing print quality and reducing the thermal and electrical stress on said thermal printhead; and wherein the temperature controlling means further includes: hysteresis control means for determining an amount of electrical pulses supplied to said each of said dot elements in said thermal printhead;

peak temperature control means for determining the width of said pulses supplied to said dot elements in said thermal printhead;

pre-heating control means for raising the temperature of said dot elements when said dot elements have been idle for a predetermined period; and substrate temperature control means for maintaining the temperature of said thermal printhead at a predetermined value.

2. The apparatus of claim 1 wherein the hysteresis control means comprises:
   means for generating a transparent pulse to said thermal printhead when a binary digit corresponding to one of said dot elements is a value of one;
   means for generating a first compensation pulse to said thermal printhead when said transparent pulse is generated and a first prior binary digit corresponding to said dot element is a value of zero;
   means for generating a second compensation pulse to said thermal printhead when said transparent pulse is generated and said first compensation pulse is generated and a second prior binary digit corresponding to said dot element is a value of zero; and
   means for generating a third compensation pulse to said thermal printhead when said transparent pulse is generated and said first compensation pulse is generated and said second compensation pulse is generated and a third prior binary digit corresponding to said dot element is a value of zero.

3. The apparatus of claim 1 wherein the peak temperature control means comprises:
   means for determining the temperature of said thermal printhead; and
   means for altering the width of said electrical pulses as a function of said thermal printhead temperature.

4. The apparatus of claim 1 wherein the pre-heating control means comprises means for generating a pre-heat pulse to said thermal printhead when a binary digit corresponding to one of said dot elements is a value of zero and a first prior binary digit corresponding to said dot element is a value of zero and a second prior binary digit corresponding to said dot element is a value of zero and a third prior binary digit corresponding to said dot element is zero.

5. The apparatus of claim 1, wherein the substrate temperature control means comprises:
   means for determining the temperature of said thermal printhead; and
   means for altering the temperature of said thermal printhead as a function of said thermal printhead temperature.

6. Temperature control apparatus for controlling temperature of dot elements of a thermal print head, comprising:
   pre-heating control means for raising the temperature of the dot elements;
   hysteresis control means for determining an amount of electrical pulses supplied to each of the dot elements in the thermal printhead; and
   peak temperature control means for determining the width of the electrical pulses supplied to the dot elements of the thermal printhead so as to maintain dot element temperature within a peak dot temperature range above a minimum required transfer temperature and below a predetermined peak dot temperature while limiting differential peak dot temperature.

7. An apparatus according to claim 6, wherein the pre-heating control means raises the temperature of the dot elements when the dot elements have been idle for a predetermined period.

8. An apparatus according to claim 7, further including substrate temperature control means for maintaining the temperature of the thermal printhead at a predetermined value.

9. An apparatus according to claim 8, wherein the peak temperature control means includes;
   means for determining the temperature of the thermal printhead; and
   means for altering the width of the electrical pulses as a function of the thermal printhead temperature.

10. A method for controlling temperature of dot elements of a thermal printhead, comprising the steps of:
    pre-heating the dot elements when the of elements have been idle for a predetermine period of time;
    determining an amount of electrical pulses to be supplied to each of the dot elements in the thermal printhead; and
    determining the width of the electrical pulses to the dot elements of the thermal printhead so as to maintain dot element temperature within a peak dot temperature range above a minimum required transfer temperature and below a predetermined peak dot temperature while limiting differential peak dot temperature.

11. A method according to claim 10, further including the step of maintaining the temperature of the thermal printhead at a predetermined value.

12. A method according to claim 10, wherein the step of determining the width of the electrical pulses includes the steps of:
    determining the temperature of the thermal printhead; and altering the width of the electrical pulses as a function of the thermal printhead temperature.

* * * * *